United States Patent [19]

Colanzi et al.

[11] Patent Number: 4,874,261
[45] Date of Patent: Oct. 17, 1989

[54] SEAL FOR BEARINGS

[75] Inventors: Franco Colanzi; Angelo Vignotto, both of Turin, Italy

[73] Assignee: Riv-SKF Officine di Villar Perosa S.p.A., Turin, Italy

[21] Appl. No.: 276,800

[22] Filed: Nov. 28, 1988

[30] Foreign Application Priority Data

Dec. 23, 1987 [IT] Italy .................................. 68117 A/87

[51] Int. Cl.$^4$ ............................................. F16C 33/78
[52] U.S. Cl. ..................................... 384/484; 277/37; 384/477
[58] Field of Search ................ 384/484, 477, 485, 486, 384/147, 148; 277/37, 207 R

[56] References Cited

U.S. PATENT DOCUMENTS

| | | |
|---|---|---|
| 2,830,858 | 4/1958 | Moorman et al. ................... 384/484 |
| 3,028,203 | 4/1962 | Lund et al. ............................ 277/37 |
| 4,026,563 | 5/1977 | Bainard .................................. 277/37 |
| 4,283,063 | 8/1981 | Prescott ................................. 277/37 |

Primary Examiner—Lenard A. Footland
Attorney, Agent, or Firm—Eugene E. Renz, Jr.

[57] ABSTRACT

A sealing shield assembly for a rolling bearing has at least one ring with a seat comprising at least one essentially reinforcing member and an anchoring device made of an elastomeric material for securing the enforcing member in the bearing seat. The reinforcing member includes a peripheral annular sleeve portion shaped like a cylindrical sleeve, and an anchoring device which includes a radially elastically compressible sleeve section made of an elastomeric material. It is secured as a unit to the sleeve portion on a lateral coupling surface thereof, and is adapted to be interposed between the annular sleeve portion and the bearing seat. A plurality of axial grooves are on a separate lateral surface opposite the said coupling surface of the annular sleeve portion. The grooves extend from a continuous annular end portion of the elastomeric sleeve section to a point corresponding to a terminal rim of the annular sleeve portion interrupted by the grooves. The elastomeric sleeve section is capable of interacting radially with interference with the bearing seat.

10 Claims, 2 Drawing Sheets

SEAL FOR BEARINGS

FIELD OF THE INVENTION

The present invention relates to improvements in seals for bearings and particularly one characterized by novel features of construction and arrangement including an improved anchoring device for mounting the seal in a leak proof manner.

BACKGROUND OF THE INVENTION

Some sealing systems used for sealing the annular space between the rings of a bearing assembly include a pair of sealing shields which are inserted in coaxial combination between the rings of the bearings, one of the shields being attached to the outer ring and the other to the inner ring. One of the shields is usually provided with one or more sealing lips capable of interacting either radially or axially with the other shield or directly with a surface of the opposing ring in cases where the sealing system includes only a single shield. The shield attached to one of the rings must be capable of frictionally engaging with a seating surface in the ring itself. For this purpose the shields were usually provided with anchoring means which comprises either a sleeve shaped portion of an internal metallic reinforcing member of the shield or an elastomeric sleeve which can be elastically compressed radially usually produced as a unit with the sealing lips capable of engaging with interference with the seat so as to remain interposed between the seat and sleeve portion of the reinforcing member of the shield. In the first instance, the securing occurs by means of direct interference fit between the seat and the sleeve portion of the reinforcing element of the sealing shield. Of course, in order to achieve a friction fit, the housing seat on the shield has to be made to very high precision within predetermined controlled restricted tolerances which experience has shown causes a number of design difficulties. Moreover, a press or interference fit is highly subject to dimensional changes resulting from differential thermal expansion which may occur during use in the coupled parts to the extent that in some severe cases, uncoupling can result with consequent detachment of the sealing shield from the bearing. This breakdown, of course, runs the risk of contaminants entering the bearing space and causing premature failure of the bearing.

In the second instance where the resilient sealing element is elastically compressed, the dangers of high tolerances are not present with the serious attendant consequences nor does the housing seat of the shield need to be worked with excessive precision since interposition of a compressible layer of rubber between the seat and the reinforcing element ensures that any inaccuracies in the construction of the seat and any thermal expansion are compensated for or absorbed. It has been found, however, that this type of joint presents other disadvantages and drawbacks. For example, it does not ensure precise correct axial positioning of the shield in the seat. More specifically, as the elastomeric sleeve deforms radially it also deforms axially and thus, presents a certain difficulty of seating or inserting the same in the seat. Consequently, this type of coupling can cause a decrease or even loss of the sealing action against external contaminants such as water and dust and loss of the internal lubricating grease of the bearing, especially in seals fitted with axial sealing lips.

SUMMARY OF THE INVENTION

With the foregoing in mind, it is an object of the present invention to provide a sealing shield for bearings which overcomes the difficulty and drawbacks of the sealing shields described above. More specifically, it is an objection of the present invention to provide a shield which is characterized by novel features of construction and arrangement capable of simultaneously providing compensation for thermal expansion and/or inaccuracies in the construction of the seat and also ensure correct precise axial positioning of the shield.

To this end, in accordance with the present invention, the seal shield comprises at least one generally rigid reinforcing member and an anchoring device for securing the reinforcing member within a seat. The anchoring mechanism constitutes a peripheral annular portion of the reinforcing member configured to the shape of a cylindrical sleeve and a radially elastically compressible sleeve made of an elastomeric material secured to the sleeve portion of the reinforcing member which interengages between the sleeve portion of the reinforcing member and the seat. In accordance with the present invention, the elastically compressible sleeve has a plurality of axial grooves on a separate lateral surface opposite the juncture of the sleeve to the reinforcing member. The grooves extend from a continuous annular end portion of the elastomeric sleeve to a point corresponding to the peripheral rim of the sleeve interrupted by the grooves. By this arrangement upon assembly of the seal, the resilient sleeve is deformed radially and in this process the axial grooves permit free axial expansion without compromising the axial positioning of the shield. In other words, the compressed material is displaced to partially fill the grooves. Thus the shield assembly of the present invention is simple and economical to manufacture and offers great ease of installation since the contact surface between the seat and the elastomeric sleeve is essentially reduced to nothing more than the zone of the continuous portion and the tops of the ribs and is thus perceptibly reduced compared with conventional sleeves which do not utilize grooves. The configuration thus ensures axial positioning of the shield and also compensates for any imperfections in the seat and any ovality.

BRIEF DESCRIPTION OF THE DRAWINGS

These and other objects of the present invention and the various features and details of the operation and construction thereof are hereinafter more fully set forth with reference to the accompanying drawings, where.

DETAILED DESCRIPTION OF THE PREFERRED EMBODIMENT

Figure 1:
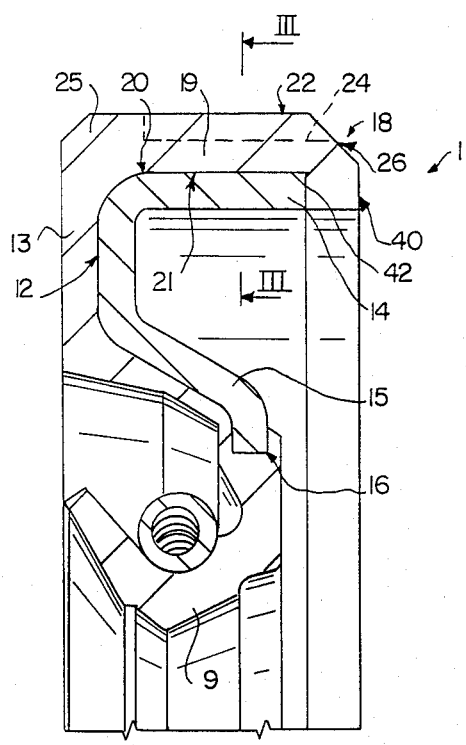
FIG. 1 is a transverse sectional view of a seal shield construct in accordance with the present invention.
Figure 3:
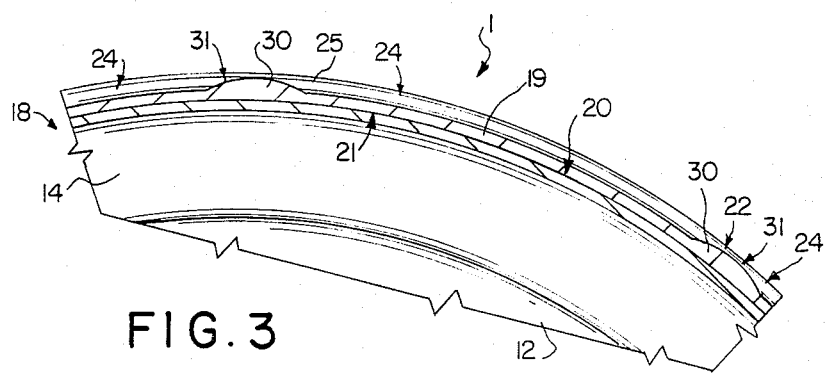
FIG. 3 is a sectional view taken along the lines 3-3 of FIG. 1.
Figure 5:
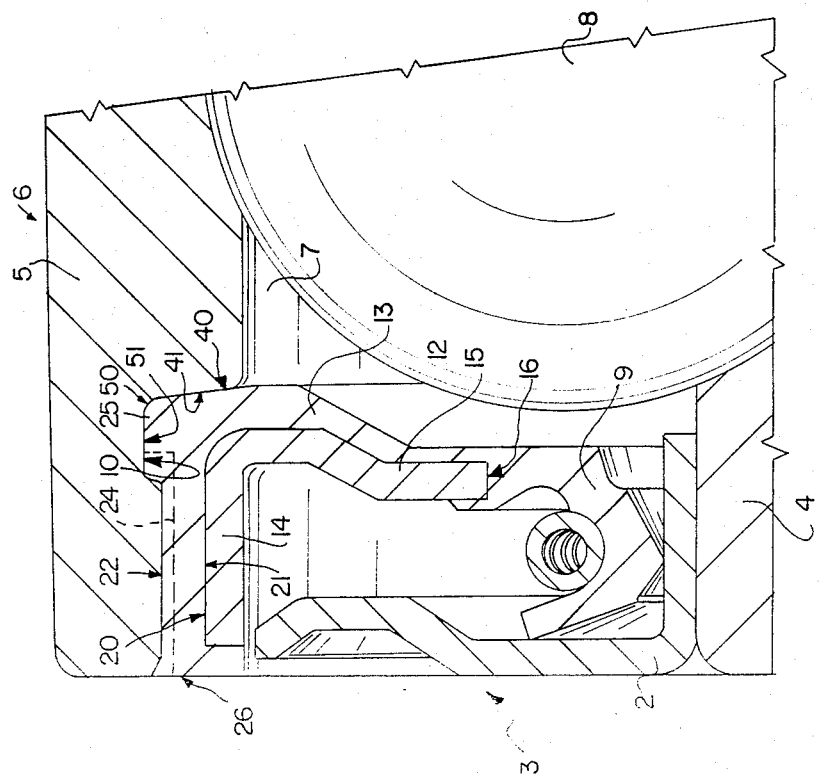
FIG. 5 shows the sealed configuration of FIG. 1 applied to a bearing.

Referring now to the drawings and particularly to FIGS. 1, 3 and 5 thereof, there is shown a sealing shield assembly in accordance with the present invention generally designated by the numeral 1. The shield assembly 1 may be coupled with a second shield 2 of conventional form to provide a sealing system 3 for sealing the annular space between the inner and outer rings 4 and 5 of a bearing assembly 6. In this instance the shield 2 is made entirely of sheet metal and is secured to the inner ring 4 of the bearing 6.

The shield assembly 1 includes a circumferentially extending radially inwardly directed elastomeric sealing lip 9 adapted to interact and engage the shield 2 axially and radially and is secured to the outer ring 5 of the bearing 6 in an annular circumferentially extending seat 10.

The shield assembly as best illustrated in FIG. 1, comprises a generally rigid internal reinforcing member 12 made a sheet metal having a generally inverted L-shaped cross section and a resilient covering 13 made of an elastomeric material vulcanized to and surrounding the reinforcing element and including the flexible lip 9. As illustrated the reinforcing member 12 is of inverted L-shaped configuration comprising a axially extending annular portion 14 in the form of a cylindrical sleeve defining the lateral wall of the reinforcing member and a radially inwardly directed portion 15 defining a base wall of the reinforcing member and formed essentially orthogonally and coaxially with the lateral sleeve portion 14 terminating along its inner peripheral edge in an internal peripheral rim 16 from which the lip 9 projects radially inwardly.

The shield 1 is secured axially in the seat 10 in an angularly immovable manner to the ring 5 by means of an anchoring device generally referenced by the numeral 18. The anchoring device comprises the sleeve portion 14 of the reinforcing member 12 and a cylindrical sleeve 19 which is made of an elastomeric material so that it is elastically compressible in a radial direction which as illustrated preferably forms an integral part of the cover element 13. The sleeve 19 is preferably formed integral in a single unitary assembly with cover element 13 and with the sealing lip 9. More specifically, the sleeve 19 during use remains interposed between the seat 10 and the sleeve portion 14 of the reinforcing member 12 so as to interact radially and provide an interference fit with the seat 10. To this end, one of the lateral internal cylindrical surfaces 21 is secured as a unit coaxially with a coupling surface 20 of the sleeve portion 14 which as illustrated is defined by one external cylindrical lateral surface 14a of the sleeve portion 14 and is capable of interaction directly with the seat 10.

In accordance with the present invention, one external cylindrical lateral surface 22 of the sleeve 19 opposite the coupling surface 21 is provided with a plurality of axially directed grooves 24 which extend from a continuous annular end portion 25 of the sleeve 19 to a point corresponding to a discontinuous terminal rim 26 of the latter, the continuity of which is interrupted by the grooves 24. The grooves 24 are defined laterally by longitudinal ribs 30 formed in line with the lateral surface 22. The lateral surface 22 is defined by the top of the ribs and the end portion 25 of the sleeve 19 which is continuous since it has no groove 24 and is of a predetermined shape to interact with interference in a fluid type manner with the seat 10. In the embodiment of the invention illustrated, the ribs 30 are each defined by a corresponding portion of a cylindrical surface 31 having a diameter D smaller than that of the diameter $D_1$ of surface 22 whereas the axial grooves 24 are of a dimension so as to allow elastic upsetting of the continuous annular end sealing portion 25 of the elastomeric sleeve 19 during insertion of the shield 1 into the seat 10. To this end, the axial grooves 24 may have a relatively large circumferential breadth, for example of 30 degrees or more and a depth substantially equal to approximately half the thickness radially of the elastomeric sleeve 19.

In the embodiment illustrated, the sleeve 19 is formed in such a way for example by machining at its terminal rim 26 interrupted by the grooves 24 is placed on the side opposite the radially inner portion 15 of the reinforcing member 12 so that its continuous portion 25 without the grooves is placed on the side opposite a frontal face 40 of the latter in position to abut an axial shoulder 41 of the seat 10. In this manner, the frontal face 40 of the sleeve 19 covers a corresponding frontal rim 42 of the sleeve portion 14 of the reinforcing member 12 aligned with the rim 26.

Figure 2:
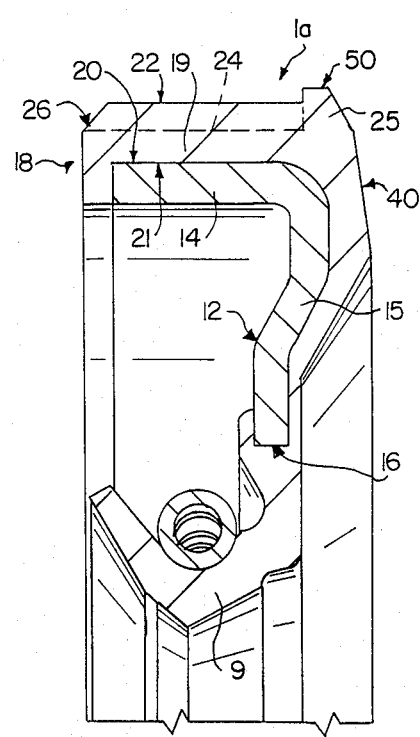
FIG. 2 is a transverse sectional view similar to FIG. 1 showing a modified form of the shield assembly.
Figure 4:
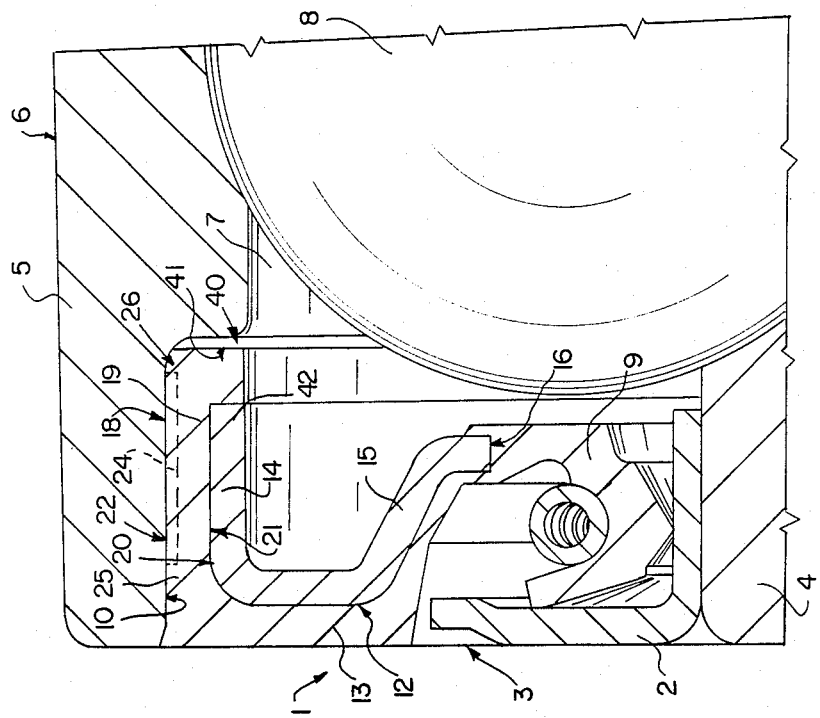
FIG. 4 is a sectional view showing the shield configuration of FIG. 2 assembled in a bearing.

There is illustrated in FIGS. 2 and 4 a modified embodiment of seal in accordance with the present invention wherein the structural details which are similar or identical to those already described above in connection with the principal embodiment bear the same reference numerals for sake of simplicity. Thus, in accordance with this embodiment, the seal which is generally designated by the numeral 1a has the rim 26 again placed on the side opposite the inner portion 15 of the reinforcing member but is shaped in a manner reflectionally symmetrical to that of the reinforcing member 12 of the shield 1 such that the continuous annular seating portion 25 is located on the side of the front face 40 of the sleeve 19. The front face is still capable of abutting the axial shoulder 41 of the seat but covers along with a rim of the reinforcing member 12 as in the preceding embodiment, the junction zone 48 between the sleeve portions 14 and 15. Further in accordance with the seal assembly 1a of the embodiment illustrated in 2 and 4, the portion 25 is provided with a continuous annular ridge 50 which projects from the surface 22 and is therefore capable of being more highly deformed than the remainder of the portion 25 during insertion into the seat 10 and thereby provide an improved sealing an anchoring action. This portion 25 may also snap fit into a throat 21 which may be present in the seat 10 as in the previously described embodiment.

Consider now assembly of the shield assemblies 1 or 1a in accordance with the present invention. Thus the shield 1 or 1a is inserted axially into the seat 10. During movement of the shield into the seat, an interference interaction takes place between the sleeve 19 and the seat 10. More specifically, the sleeve 19 is deformed and compressed radially whereby the material of the sleeve 19 and particular of the portion 25 which is compressed radially can freely expand axially without compromising the axial position of the shield. Specifically, this compressed material can be displaced or upset inside the grooves 24 thereby partially filling them. Similarly the radially compressed material of the ribs 30 can expand circumferentially between the grooves 24 which are located on either side of each rib 30. Consequently this material can also upset in the grooves 24 without blocking deformation of the continuous portion 25 which itself having no grooves also ensures a hydraulic sealing action in the seat. Considering assembly of the shield 1a in a seat having a throat 21, a blocking action is produced by friction as a consequence of the interference between sleeve 19 and seat 10 and an additional axial blocking action is provided by engagement of the ridge 50 in the throat 51.

The present invention provides functional advantages over prior art seals. For example, a shield assembly in accordance with the present invention is simple and economical to manufacture and is relatively easy to install since the contact surface between seat and elastomeric sleeve is reduced to nothing more than the zone of the continuous portion 25 and the tops of the ribs 30 and is thus perceptibly reduced to compare with a conventional sleeve without grooves. Furthermore the grooves permit the press material to be displaced in a manner described more specifically above thereby ensuring correct axial positioning of the shield. This action also compensates to some degree for any imperfections in the finish of the seat 10 and also any ovality in the seat. Moreover, the anchoring system of the present invention compensates for other deformations without sacrificing the fluid-tight coupling between the shield and the seat.

What is claimed is:

1. Sealing shield assembly for a rolling bearing having at least one ring with a seat comprising at least one essentially reinforcing member and an anchoring device made of an elastomeric material for securing said reinforcing member in the bearing seat, said reinforcing member including a peripheral annular sleeve portion shaped like a cylindrical sleeve, and said anchoring device including a radially elastically compressible sleeve section made of an elastomeric material and secured as a unit to the said reinforcing sleeve portion on a lateral coupling surface thereof, adapted to be interposed between the said annular sleeve portion and the bearing seat, a plurality of axial grooves on a separate lateral surface opposite the said coupling surface of said reinforcing annular sleeve portion, said grooves extending from a continuous annular end portion of the said elastomeric sleeve section to a point corresponding to a terminal rim of the said sleeve section interrupted by the said grooves, said elastomeric sleeve section being capable of interacting radially with interference with the bearing seat.

2. Sealing shield according to claim 1, wherein said continuous annular end portion of the said elastomeric sleeve section is provided with a continuous annular ridge which projects from said lateral surface of the elastomeric sleeve section provided with the said grooves.

3. Sealing shield according to claim 1, wherein said lateral surface of the elastomeric sleeve section is essentially cylindrical, with the said axial grooves being defined laterally by respective longitudinal ribs produced in line with the said lateral surface of the elastomeric sleeve section, and being each defined by a corresponding portion of cylindrical surface having a diameter less than that of the said lateral surface of said elastomeric sleeve section.

4. Sealing shield according to claim 1, wherein said reinforcing member is made of folded sheet metal and is cup-shaped, comprising in addition to the said peripheral portion shaped like a cylindrical sleeve, which defines one external lateral wall, also a radially more internal annular portion defining a bottom wall with the said coupling surface being defined by an external lateral surface, cylindrical, of the said sleeve portion, with the latter being secured as a unit to a corresponding internal lateral surface of the said elastomeric sleeve, one external lateral cylindrical surface of which is provided with the said axial grooves.

5. Sealing shield according to claim 4, wherein said terminal rim of the said elastomeric sleeve, interrupted by the said axial grooves, is placed on the side opposite the said more radially internal annular portion of the said armature.

6. Sealing shield according to claim 1, wherein said elastomeric sleeve is produced as a unit with at lest one annular sealing lip projecting radially from a peripheral rim of the said reinforcing member, with the said lip being capable of interacting with a rigid shield that may be present, which can be coupled with the said sealing shield inside the bearing seat.

7. Sealing shield according to claim 1, wherein the said continuous annular end portion of the said elastomeric sleeve is placed on the side of one frontal face of the latter, capable of contacting an axial shoulder of the bearing seat.

8. Sealing shield according to claim 1, wherein said continuous annular end portion of the said elastomeric sleeve is placed on the opposite side of the frontal face of the latter, capable of butting against an axial shoulder of the bearing seat, and covering a corresponding frontal rim of the said sleeve portion of the said reinforcing member.

9. Sealing shield according to claim 1, wherein said axial grooves have dimensions such as to allow elastic upsetting of the said continuous annular portion of the said elastomeric sleeve inside them as a consequence of insertion of the said shield into the bearing seat, with the said continuous annular portion of the elastomeric sleeve being capable of interacting with interference, in a fluid-tight manner, with the bearing seat.

10. Sealing shield according to claim 9, wherein said axial grooves have a relatively wide breadth and a depth essentially equal to approximately half the radial thickness of the said elastomeric sleeve.

* * * * *